United States Patent [19]
Fenske et al.

[11] Patent Number: 5,781,398
[45] Date of Patent: Jul. 14, 1998

[54] DUAL FAULT TOLERANT ACTUATOR CONTROL SYSTEM

[75] Inventors: Allen J. Fenske, Seminole; Hendrik C. Gelderloos, Largo, both of Fla.

[73] Assignee: Honeywell Inc., Minneapolis, Minn.

[21] Appl. No.: 787,516

[22] Filed: Jan. 21, 1997

Related U.S. Application Data

[63] Continuation of Ser. No. 233,841, Apr. 26, 1994, abandoned.

[51] Int. Cl.$^6$ ............................................. B64G 1/24
[52] U.S. Cl. .................... 361/171; 307/115; 244/158 R; 701/13
[58] Field of Search .................... 244/158 R, 164, 244/169, 172, 176; 361/143, 152–154, 160, 166, 170, 171, 172, 196, 203, 189, 190; 307/115, 141.8, 113; 326/10–14; 364/424.023, 459; 701/13, 226

[56] References Cited

U.S. PATENT DOCUMENTS

| | | | |
|---|---|---|---|
| 2,974,594 | 3/1961 | Boehm | 244/169 |
| 3,813,021 | 5/1974 | Kramer | 361/190 X |
| 4,041,334 | 8/1977 | Umeda | 361/196 |
| 4,096,802 | 6/1978 | Waln | 102/49.5 |
| 4,238,813 | 12/1980 | Carp et al. | 361/154 |
| 4,412,268 | 10/1983 | Dassow | 361/189 |
| 4,449,161 | 5/1984 | Kling | 361/190 X |
| 4,731,551 | 3/1988 | Gibbs et al. | 307/141.4 X |
| 4,890,188 | 12/1989 | Russell et al. | 361/154 |
| 5,012,967 | 5/1991 | Johansson | 361/190 X |
| 5,062,593 | 11/1991 | Goddard et al. | 244/169 |
| 5,083,276 | 1/1992 | Okano et al. | 307/10.1 |
| 5,235,217 | 8/1993 | Kirton | 361/189 X |
| 5,255,152 | 10/1993 | Estes, III et al. | 361/203 |
| 5,341,036 | 8/1994 | Wheeler et al. | 361/189 X |
| 5,400,252 | 3/1995 | Kazimi et al. | 364/459 |
| 5,467,245 | 11/1995 | Newbould | 361/170 |

*Primary Examiner*—Fritz Fleming
*Attorney, Agent, or Firm*—Robert E. Greenstien

[57] ABSTRACT

A dual fault tolerant control system for controlling power delivered to an actuator from a power source includes decoders which accept commands representing the length of time power is to be applied to the actuator. Controllers process the command and control power inhibits based upon the length of time indicated by the command for supplying power to the actuator. The dual fault tolerant feature allows reassurance that power is applied to the actuator for the length of time dictated by the command.

2 Claims, 2 Drawing Sheets

DUAL FAULT TOLERANT ACTUATOR CONTROL SYSTEM

This is a continuation of copending application Ser. No. 08/233,841, filed Apr. 126,1994, now abandoned.

BACKGROUND OF THE INVENTION

The present invention is directed primarily to a control system for controlling power to a load. In particular, the present invention is a dual fault tolerant actuator control system for controlling the firing of engines in a space vehicle.

Controlling the movement of a vehicle within the earth's atmosphere or beyond the earth's atmosphere is of great importance. In particular, with regard to space vehicles, it is necessary to control their movement with a high degree of precision, since the success of the space mission and accomplishment of mission objectives is often dependent upon the accurate maneuvering of the space vehicle. It is especially critical to precisely maneuver an unmanned space vehicle, such as a satellite, in the vicinity of a manned vehicle, such as a space shuttle or space station, since the well being of the crew of the manned vehicle depends upon the precise and complete control of the unmanned vehicle.

Typically, actuators are used to maneuver space vehicles (either manned or unmanned) by controlling when the engines of the space vehicle are fired and by controlling the duration of the engine burn. Therefore, the actuators must be precisely controlled so that the burn of the engines is initiated and terminated at the proper times to insure that the space vehicle is accurately maneuvered. In particular, it is extremely important that the actuators for firing the engines of an unmanned space vehicle be precisely controlled when the engines of the unmanned space vehicle are fired in the vicinity of a manned vehicle. By precisely controlling the actuators for the engines of the unmanned space vehicle, the unmanned space vehicle can be accurately maneuvered relative to the manned space vehicle, thereby protecting the well being of the crew of the manned space vehicle.

SUMMARY OF THE INVENTION

The present invention is a control system for controlling power delivered to an actuator from a power source. The control system includes means for accepting a command representing a length of time that power from the power source is to be applied to the actuator, and means for terminating the power applied to the actuator from the power source. Control means coupled to the command acceptance means and the termination means receives the command from the acceptance means and controls the termination means so that power from the power source is applied to the actuator for the length of time defined by the command. In the preferred embodiment of the present invention, the actuator is coupled to the engines of a space vehicle, such as an unmanned space vehicle. In this preferred embodiment, the control system precisely controls the actuator so that the firing of the engines is initiated and terminated at the proper times and the engine burn duration is controlled. By precisely controlling the actuator, and thereby the engines of the unmanned space vehicle, the control system allows the unmanned space vehicle to be accurately maneuvered, particularly in the vicinity of a manned space vehicle. Accurate maneuvering of the unmanned space vehicle relative to the manned space vehicle protects the well being of the crew of the manned space vehicle.

DETAILED DESCRIPTION OF THE PRESENT INVENTION

Figure 1:
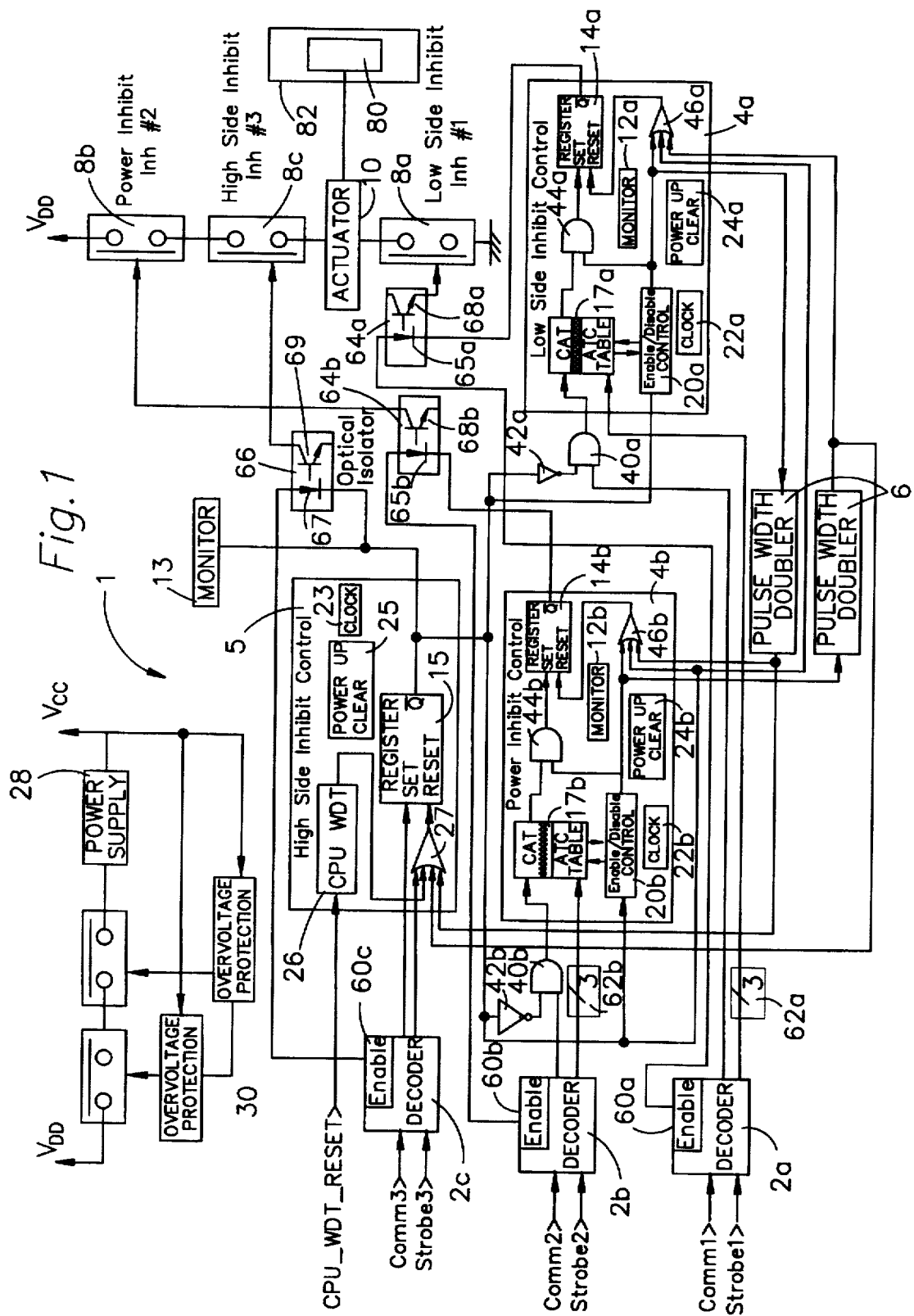
FIG. 1 shows a block diagram of the control system.

The present invention as illustrated in a block diagram in FIG. 1 is a fault tolerant control system 1 for controlling the application of power to an actuator 10. The actuator 10 in a preferred embodiment is used to actuate the firing of engines 80 in a space vehicle, such as an unmanned space vehicle 82. This is only one embodiment of the present invention. Alternatively, the fault tolerant control system 1 can be used with any system that controls the power to a load.

As seen in FIG. 1, the control system 1 includes three main components. A first component is defined by decoders 2a, 2b and 2c. A second component is defined by controllers 4a, 4b and 5 and a third component is defined by power inhibits 8a, 8b and 8c. The decoders 2a, 2b and 2c decode 16-bit databuses. An output of the decoders 2a, 2b and 2c is one bit that is used as a power enables 60a, 60b and 60c. The decoders 2a, 2b and 2c are well known in this area of technology. The power inhibits 8a, 8b and 8c in the preferred embodiment are MOSFETs, but many other implementations can be used such as relays or BJTs. As is evident from FIG. 1, the decoders 2a, 2b and 2c, the controllers 4a, 4b and 5, and the power inhibits 8a, 8b and 8c define three independent pathways, with each pathway using separate hardware/electrical components that are not shared by other pathways.

Each controller 4a, 4b and 5 is further defined by a plurality of elements. The first controller 4a and the second controller 4b are defined by identical elements. The first and second controllers 4a and 4b respectively include a Command Acceptance Timer (CAT)/Authorization Time Cap (ATC) table counter 17a and 17b, a 3 bit input data bus 62a and 62b, an enable/disable control 20a and 20b, a register 14a and 14b with a Q bar, a 3 bit data bus monitor 12a and 12b, a clock 22a and 22b (both of the same frequency), a power up clear 24a and 24b, an optical isolator 64a and 64b and various logic elements. All the elements are well known in this area of technology. Items 20a, 20b, 14a, 14b, 12a, 12b are encompassed in programmable array logic.

The third controller 5 includes a register 15 with a Q bar, a counter which is a CPU Watch Dog Timer (WDT) 26, a power up clear 25, a clock 23, combinational logic shown as an OR gate 27 and an optical isolator 66. The third controller 5 contains a monitor 13 of the register 15 output which is sent to a vehicle command center or to the source of the commands sent to decoders 2a and 2b. Again, all the elements in this controller 5 are well known in this area of technology. The preferred embodiment also includes one power supply 28 and overvoltage protection elements 30 all of which are well known in this area of technology.

Each decoder 2a, 2b and 2c is connected with a respective controller 4a, 4b and 5 and the anode of the respective optical isolators 64a, 64b and 66. The first and second decoders 2a and 2b are connected to their respective controllers 4a and 4b via a single command bit and a 3 bit data bus 62a and 62b. Another single bit, designated power enable 60a, 60b and 60c, is connected to the LED 65a, 65b and 67 anode of the optical isolators 64a, 64b and 66. The controllers 4a, 4b and 5 are in turn connected with the LED cathodes of the optical isolators 64a, 64b and 66. Phototransistors 68a, 68b and 69 within the optical isolators 64a, 64b and 66 are connected to the respective power inhibits 8a, 8b and 8c. The controllers 4a, 4b and 5 are all interconnected with each other. Between some of the connections of the controllers 4a, 4b and 5 exist pulse width doublers 6 which are well known in this area of technology.

The first controller and the second controller 4a and 4b include the same elements and will be described together.

Within the first and second controllers 4a and 4b, the CAT/ATC counter 17a and 17b is connected with the enable/disable control 20a and 20b both of which are connected with an AND gate 44a and 44b which is in turn connected to the register 14a and 14b. Respective enable/disable control 20a and 20b is also connected with the register 15 of controller 5 and an ORing function 46a and 46b which is also connected to the register 14a and 14b within the controller 4a and 4b. The registers 14a and 14b of the first and second controllers 4a and 4b are connected to the LED 65a and 65b cathodes of the optical isolators 64a and 64b. Turning on the LEDs biases the phototransistor 68a and 68b part of the optical isolator 64a and 64b which is connected to the corresponding power inhibits 8a and 8b. In controller three 5, the CPU WDT 26 is connected to an ORing function 27 which is in turn connected to the register 15. The register 15 is also connected to the decoder 2c, the first and second controller 4a and 4b and the LED 67 cathode of the optical isolator 66. The phototransistor 69 within the optical isolator 66 is connected to the third power inhibit 8c.

In operation, a control center (not shown) is located at some remote site on earth while the space vehicle that the control system 1 is located on is in the air or in space. The control center can be manned by a computer or a human being. The control center selects one time period, of a plurality of desired previously determined time periods residing within the ATC table 17a and 17b, within which power can be supplied to the actuator 10 to fire the engines 80 of the space vehicle 82. These time periods are called burn windows or Authorization Time Caps in the preferred embodiment. The ATCs are intended to discontinue the burn in the event a termination command is not issued to decoder 2c or controller 5 fails. The data pathway of the decoder 2c and controller 5 is used to control initiation and termination of the actual planned burn. The planned burn is of a time period less than the burn window period controlled by controller 4a and 4b. In the present embodiment, there are eight selections for burn windows in which each selection is a three bit data word. One of the selections is an "all clear" command. "All clear" is selected when an error has been made in a burn window selection and all the data sent to the controllers 4a and 4b is cleared and the registers 14a, 14b and 15 are issued a reset. In the preferred embodiment, the other seven burn window selections are as follows: 20, 40, 70, 90, 120, 500 and 900 seconds. Selection of a burn window is sent in the form of a 16-bit data command (see FIG. 1) to the decoders 2a, 2b and 2c. A strobe pulse is issued simultaneously or shortly after to command the decoders 2a, 2b and 2c to decode the 16-bit data command. Decoders 2a, 2b and 2c verify that a valid command has been sent based on the configuration of the data command. This is to prevent spurious commands that may have been sent as a result of noise or stuck bits. Once the command has been verified, the command is forwarded to the controllers 4a, 4b and 5. Four of the 16 bits are further decoded to set the power enables 60a, 60b and 60c. The power enables 60a, 60b and 60c then issue a logic high signal to the LED 65a, 65b and 67 anodes of the optical isolators 64a, 64b and 66.

The decoders 2a, 2b and 2c are connected with three respective controllers 4a, 4b and 5. In the preferred embodiment, the commands for the burn window are sent in sequential order. This means that the first command will be sent to the first decoder 2a, the second command will be sent to the second decoder 2b and the third command will be sent to the third decoder 2c. The command through the third decoder 2c must always follow the other two commands. The burn window commands for the controllers 4a and 4b will limit the duration of the firing of the engines 80 in the event a termination command is not issued via decoder 2c. Controller 5 responds immediately to commands via decoder 2c for precise maneuverability of the space vehicle 82. If controller 5 or the command center communication link fails, controllers 4a and 4b will terminate the burn once the burn window period has elapsed to limit the movement of the vehicle 82; maintaining safe distance from nearby space vehicles such as the space shuttle.

The first controller 4a gets a command first. This command will register as a logic "high" as indicated by timing line 52a in FIG. 2. The first command will encounter an AND gate 40a first before entering the first controller 4a. The command will be ANDed with a signal from the third controller 5. All the logic settings in all the controllers 4a, 4b and 5 are "low" since no command has been sent there yet. Therefore, after inversion by an inverter 42a, the signal will be ANDed with the command signal and allowed to enter the first controller 4a. This feature is to prevent commands from entering the first controller 4a once a burn command has been issued prematurely by the third controller 5 or in the event the third controller 5 has failed on ("high"). For example, after the burn command for the third controller 5 has been issued, the burn period will be initiated for controllers 4a and 4b. During the burn period, the first controller 4a does not need to accept any commands and this logic prevents command acceptance from occurring. This mode will continue until the third controller 5 issues a command to controller 4a and 4b to terminate the burn. Further, if the third controller 5 is failed "high", a command through controller 4a or 4b will be masked preventing these controllers 4a and 4b from transferring immediately from the CAT period to activation of the burn window period.

Once a burn window command has been received by the first controller 4a, a delay period is entered into for a predetermined period. This period is called a Command Acceptance Time (CAT) period (see timing line 52b in FIG. 2) and the CAT/ATC table counter 20a is used to count the time period. In the preferred embodiment the time period is 20 seconds in which the counter 20a counts 20 pulses.

During this time, all commands that may be sent to the controller 4a via the decoder 2a are ignored except the "all clear" command mentioned earlier.

The CAT period could end if one of two situations occurs. If the 20 seconds expires or no signal from the third controller 5 has been sent, then nothing happens and no burn occurs. In the event that no command is selected, the control 20a remains in a logic "low" state which is disable and no burn occurs. The register 1 4a stays in the reset state which is "low" and is ready for future burn window commands. Note the inverted output of the register is used to forward bias the LED in the optical isolators.

This is accomplished by the Q bar in the register 14a. This output, in turn, biases the phototransistor 68a which controls the inhibit 8a. The controller 4a could also be reset if the second controller 4b sends a disable signal or the third controller 5 sends a reset signal (or termination).

Figure 2:
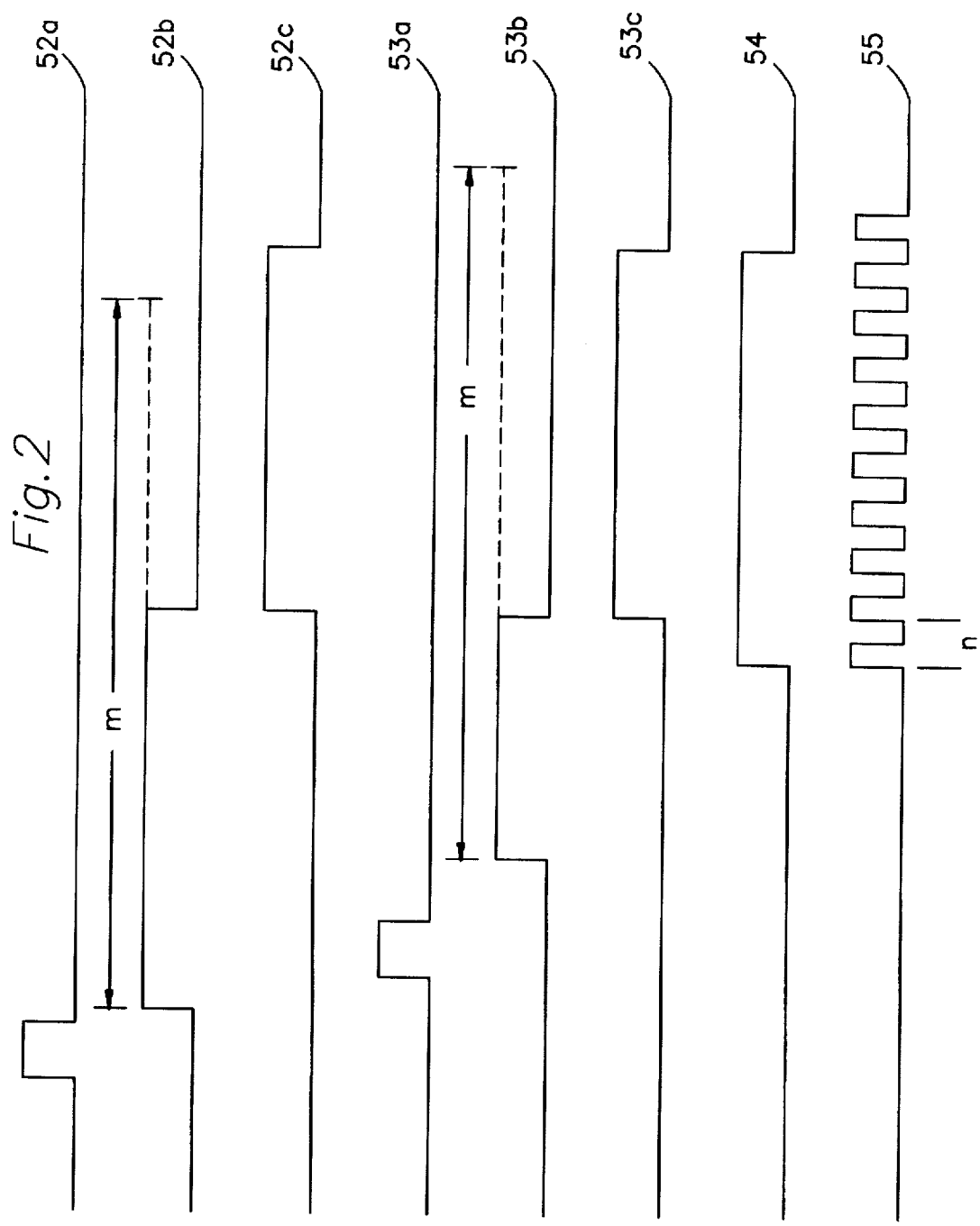
FIG. 2 shows a timing diagram of the control system.

If the third controller 5 does send a signal, then the control 20a is set "high" and enabled. A signal is sent to the CAT/ATC table counter 17a. The CAT period is then ended and the burn window is initiated and the counter 17a begins anew to count clock pulses for the duration of the burn window as seen in FIG. 2 (52c). The enable signal which is "high" is ANDed with the counter 17a which is "high" as seen in FIG. 2 and sets the register 14a and burn commences. Burning can then end by a termination signal sent from the control center to the third controller 5 in which a "low" signal will be sent to reset the register 15 in the third controller 5 and terminate burning. The reset signal which is "low" will then be sent to the first and second controller 4a and 4b and set the enable/disable control 20a and 20b to disable and terminate burning in the first and second controllers 4a and 4b.

Burning could also terminate at the end of the burn window. The signal goes "low", as 52c, and is sent to the control 20a which becomes disabled. Once the control 20a is "low", the register 14a is reset and a new command can be received by the controller 4a.

Additional components in the controller 4a include a clock 22a, a power up clear 24a, a monitor 12a and logic elements. The clock 22a just controls the timing in the controller 4a. The power up clear 24a is a standard means holding the controller 4a in reset until the supply voltage elevates to within device specifications. For example, the controller 4a may issue spurious data before the power is sufficient for the controller 4a. The voltage required in the present embodiment is 4.5V, therefore, the controller 4a should not power up until 4.75 V is reached (margin added). The power up clear 24a holds the controller 4a in a default state until 4.75 V is reached. The monitor 12 is a three bit data bus that sends the burn window selected to the user.

The second controller 4b operates very similar to the first controller 4a. The second controller 4b receives a command for power inhibit control from the second decoder 2b. The command to the second controller 4b must be the same as the first controller 4a so that all the power inhibits 8a, 8b and 8c are limited to the same burn window period for proper control of the actuator 10. Pulse width doublers 6 exist between the first and second controller 4a and 4b. Pulse width doublers are well known in this field of technology and are used in the present embodiment to double the disable signal between the first and second controller 4a and 4b. The pulse width doublers 6 exist to allow the disable signal adequate duration to meet device setup and hold requirements because the clocks 22a and 22b between the controllers 4a and 4b may be skewed. The pulse width doublers 6 increase the disable signal to last at least two clock pulses. The first and second controllers 4a and 4b operate identically. However, two controllers 4a and 4b are required to receive commands separately in order to realize the dual fault tolerant aspect of the preferred embodiment.

The third controller 5 is different from the other controllers 4a and 4b. The command sent to the third decoder 2c is sent precisely by a CPU on-board or perhaps at the control center. In the preferred embodiment, the command to the third decoder 2c originates from a different source than those to decoders 2a and 2b. A CPU WDT 26 exists in the third controller 4c as a CPU alive monitor in case of CPU failure. The WDT 26 is reset by issuing a change in state, either "high" to "low" or "low" to "high". If there is a failure and no command is received within 30 ms, a signal is sent automatically by the CPU WDT 26 to turn off all three power inhibits 8a, 8b and 8c. If the CPU WDT 26 times out, the register 15 is set to reset and the inverted output changes to a high state. This removes forward bias to the LED 67 of optical isolator 66. The phototransistor 69 turns off, which opens the power inhibit 8c, terminating the burn. A monitor 13 is used at the output of the controller 4c to monitor the command similar to the other two controllers 4a and 4b.

When a command is sent, the decoder 2c decodes the command and issues a "high" to the register 15. Four of the 16 bits are also decoded to set the power enable 60c which provides power to the optical isolator LED 67 anode which closes the inhibit 8b via the optical isolator 66. A signal is also sent to the other two controllers 4a and 4b for burn to occur. The burn is terminated by opening one or more inhibits 8a, 8b or 8c, all of which occurs when a termination command is issued to decoder 2c. When the command is verified through the decoder 2c, the register 15 is reset. This discontinues forward bias of the LED 67 in optical isolator 66 which in turn shuts off the phototransistor 69. When the phototransistor 69 turns off, the inhibit 8c opens separating power from the actuator 10. Also 4 of the 16 bits are decoded to reset the power enable 2c. This disables the output of the power enable 60c which turns off the LED 67 in the optical isolator 66. As mentioned previously, this data pathway controls the precise timing of the burn for planned maneuvering. If this pathway failed, controllers 4a and 4b would still terminate the burn once the selected burn window elapsed. If the engines 80 fired for the entire burn window period, the vehicle 82 would not be positioned as planned, however, there would still be safe distance to the neighboring space vehicles.

Another aspect of the present invention is that only one power supply 28 is necessary for the control system 1. Along with the power supply 28 exists overvoltage protection 30 so that when the voltage exceeds a set limit, 5.5 V in the present embodiment, power will be shut off.

Timing is very important in the present embodiment. The timing is shown in FIG. 2. The command to the first controller 4a is represented as the first pulse as seen in timing line 52a. The CAT period for the first controller 4a is then initiated as seen in timing line 52b. The pulse is in a "high" position representing the strobe and 16 bit command issued together. After decoding, a burn window period is selected. At this point the CAT period is initiated, designated with a length "m". In the preferred embodiment, the time period is a length of 20 seconds. If no command for burn is sent, the CAT period ends and the pulse goes "low" resetting the controller 4a to accept the next command.

Next, the command to the second controller 4b is sent as seen as timing line 53a. The second controller 4b enters a CAT period (timing line 53b) that is the same period as the first controller 4a. The burn command for the third controller 5 is then sent as seen as timing line 54. The inhibit 8c is closed within several clock cycles of clock 23 after the command propagates through the combinational logic and register 15 of controller 5. When the command for the burn is sent, the CAT period of the first and second controllers 4a and 4b is discontinued, assuming it did not time out. The burn signal for the first and second controllers 4a and 4b is then sent as indicated by a data pulse in "high" position as seen in timing lines 52c and 53c of FIG. 2. The inhibits 8a and 8b close shortly after inhibit 8c following propagation of the burn command through controllers 4a and 4b respectively. The burn does not initiate until all inhibits 8a, 8b and 8c are closed. The signal which resets the CPU WDT 26 is also shown as timing line 55 which changes in state less than every 30 ms which is designated as "n".

We claim:

1. Apparatus for controlling the firing of engine on a space craft, characterized by:

actuator means for activating the engine;

first controller means for containing a plurality of stored engine burn times, for receiving a first encoded signal to recall one of said stored engine burn times and for providing a first switch signal with a duration of said one of said stored engine burns times;

second controller means for containing said plurality of stored engine burn times, for receiving a second encoded signal to recall said one of said engine burn times and for providing a second switch signal with a duration of said one of said stored engine burn times;

third controller means for receiving a third encoded signal specifying a desired engine burn time providing a third switch signal for the duration of said desired burn time; and first, second and third switches in series for applying power to the actuator to activate the engine, the first switch being conductive in response to the first switch signal, the second switch being conductive in response to the second switch signal and the third switch being conductive to the third switch signal.

2. The apparatus described in claim 1, further characterized in that;

means for applying one of the first, second or third switch signals to its respective switch only when enable signal is produced simultaneously with said one signal.

* * * * *